(12) United States Patent
Murtagh et al.

(10) Patent No.: US 12,450,909 B2
(45) Date of Patent: Oct. 21, 2025

(54) SYSTEMS AND METHODS FOR TRACKING OBJECTS

(71) Applicant: Tyco Fire & Security GmbH, Neuhausen am Rheinfall (CH)

(72) Inventors: Bryan Robert Murtagh, Milwaukee, WI (US); Ryan Cushnahan, Milwaukee, WI (US); Kieran Gray, Milwaukee, WI (US); Jonathan Clarke, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 351 days.

(21) Appl. No.: 18/161,646

(22) Filed: Jan. 30, 2023

(65) Prior Publication Data

US 2024/0257520 A1    Aug. 1, 2024

(51) Int. Cl.
| | |
|---|---|
| *G06V 20/52* | (2022.01) |
| *G06V 10/22* | (2022.01) |
| *G06V 20/40* | (2022.01) |
| *G06V 40/16* | (2022.01) |

(52) U.S. Cl.
CPC ............ *G06V 20/52* (2022.01); *G06V 10/235* (2022.01); *G06V 20/41* (2022.01); *G06V 20/46* (2022.01); *G06V 40/172* (2022.01)

(58) Field of Classification Search
None
See application file for complete search history.

(56) References Cited

U.S. PATENT DOCUMENTS

| | | | |
|---|---|---|---|
| 10,007,862 B2 | 6/2018 | Gurwicz et al. | |
| 10,248,860 B2 | 4/2019 | Mai et al. | |
| 2009/0022374 A1* | 1/2009 | Boult | G06F 18/22 |
| | | | 382/119 |
| 2009/0074261 A1* | 3/2009 | Haupt | H04N 21/44008 |
| | | | 382/209 |
| 2011/0096149 A1 | 4/2011 | Au et al. | |

(Continued)

OTHER PUBLICATIONS

Literature Survey on Multi-Camera System and Its Application. Olagoke et al. (Year: 2020).*

(Continued)

*Primary Examiner* — Delomia L Gilliard
(74) *Attorney, Agent, or Firm* — ArentFox Schiff LLP

(57) ABSTRACT

Example implementations include a method, apparatus and computer-readable medium in a video surveillance system for tracking an of-interest (OI) object, comprising receiving, from a user interface, a request to track an object in a first video stream from a plurality of video streams captured from a first camera of a plurality of cameras installed in an environment. The implementations further include extracting at least one image of the object from the first video stream. Additionally, the implementations further include generating a unique biometric identifier of the object based on the at least one image. Additionally, the implementations further include detecting, using the unique biometric identifier, the object in a second video stream captured from a second camera of the plurality of cameras, and outputting, on the user interface, the second video stream in response to detecting the object in the second video stream.

26 Claims, 9 Drawing Sheets

(56) References Cited

U.S. PATENT DOCUMENTS

| | | | | |
|---|---|---|---|---|
| 2011/0317882 | A1* | 12/2011 | Muazam | G07C 9/257 |
| | | | | 382/117 |
| 2012/0026335 | A1* | 2/2012 | Brown | G06T 7/292 |
| | | | | 382/103 |
| 2015/0179219 | A1* | 6/2015 | Gao | G06V 10/24 |
| | | | | 386/278 |
| 2016/0180196 | A1* | 6/2016 | Taylor | G06V 10/50 |
| | | | | 382/103 |
| 2017/0046841 | A1* | 2/2017 | Bostick | G06V 20/52 |
| 2019/0042584 | A1* | 2/2019 | Jia | G06F 18/22 |
| 2025/0016399 | A1* | 1/2025 | Kachach | G06V 20/49 |

OTHER PUBLICATIONS

Extended European Search Report for European Application No. 24154568.0, dated Apr. 26, 2024 (8 pages).

Olagoke et al., "Literature Survey on Multi-Camera System and Its Application," in IEEE Access, vol. 8, pp. 172892-172922, Sep. 17, 2020.

Ye et al., "Person Tracking and Reidentification for Multicamera Indoor Video Surveillance Systems," Pattern Recognit. Image Anal. 30, 827-837, Oct. 2020.

* cited by examiner

500

---
504

Extracting the at least one image from all frames in the first video stream in which the object appears during a period of time from receiving the request — 1002

---
Extracting at least one additional image depicting a face of the person from the first video stream — 1102

↓

Generating a unique facial biometric identifier of the face of the person based on the at least one additional image — 1104

↓

508

Comparing a candidate unique facial biometric identifier of the candidate object with the unique facial biometric identifier — 1106

SYSTEMS AND METHODS FOR TRACKING OBJECTS

BACKGROUND

Technical Field

The described aspects relate to video surveillance systems.

INTRODUCTION

Aspects of the present disclosure relate generally to video surveillance systems, and more particularly, to tracking of-interest (OI) objects. A conventional tracking system is able to track objects as they move in a series of video frames. However, as the number of cameras that the video frames originate from increases, greater coordination is required. In particular, the cameras need to be placed in specific locations to cover all areas in environment and prevent large overlaps between cameras, and the tracking system then needs to be programmed to determine object movement vectors to anticipate the subsequent camera that an object will move towards. The drawbacks of conventional tracking systems thus include a cumbersome setup process and high processing and memory requirements.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method in a video surveillance system for tracking an of-interest (OI) object, comprising receiving, from a user interface, a request to track an object in a first video stream from a plurality of video streams captured from a first camera of a plurality of cameras installed in an environment. The method further includes extracting at least one image of the object from the first video stream. Additionally, the method further includes generating a unique biometric identifier of the object based on the at least one image. Additionally, the method further includes monitoring the plurality of video streams for the object by comparing a candidate unique biometric identifier of a candidate object in at least one of the plurality of video streams with the unique biometric identifier of the object. Additionally, the method further includes detecting, based on the monitoring, the object in a second video stream captured from a second camera of the plurality of cameras. Additionally, the method further includes outputting, on the user interface, the second video stream in response to detecting the object in the second video stream.

Another example aspect includes an apparatus in a video surveillance system for tracking an of-interest (OI) object, comprising a memory and a processor coupled with the memory. The processor is configured to receive, from a user interface, a request to track an object in a first video stream from a plurality of video streams captured from a first camera of a plurality of cameras installed in an environment. The processor is further configured to extract at least one image of the object from the first video stream. Additionally, the processor further configured to generate a unique biometric identifier of the object based on the at least one image. Additionally, the processor further configured to monitor the plurality of video streams for the object by comparing a candidate unique biometric identifier of a candidate object in at least one of the plurality of video streams with the unique biometric identifier of the object. Additionally, the processor further configured to detect, based on the monitoring, the object in a second video stream captured from a second camera of the plurality of cameras. Additionally, the processor further configured to output, on the user interface, the second video stream in response to detecting the object in the second video stream.

Another example aspect includes an apparatus in a video surveillance system for tracking an of-interest (OI) object, comprising means for receiving, from a user interface, a request to track an object in a first video stream from a plurality of video streams captured from a first camera of a plurality of cameras installed in an environment. The apparatus further includes means for extracting at least one image of the object from the first video stream. Additionally, the apparatus further includes means for generating a unique biometric identifier of the object based on the at least one image. Additionally, the apparatus further includes means for monitoring the plurality of video streams for the object by comparing a candidate unique biometric identifier of a candidate object in at least one of the plurality of video streams with the unique biometric identifier of the object. Additionally, the apparatus further includes means for detecting, based on the monitoring, the object in a second video stream captured from a second camera of the plurality of cameras. Additionally, the apparatus further includes means for outputting, on the user interface, the second video stream in response to detecting the object in the second video stream.

Another example aspect includes a computer-readable medium having instructions stored thereon for tracking an of-interest (OI) object in a video surveillance system, wherein the instructions are executable by a processor to receive, from a user interface, a request to track an object in a first video stream from a plurality of video streams captured from a first camera of a plurality of cameras installed in an environment. The instructions are further executable to extract at least one image of the object from the first video stream. Additionally, the instructions are further executable to generate a unique biometric identifier of the object based on the at least one image. Additionally, the instructions are further executable to monitor the plurality of video streams for the object by comparing a candidate unique biometric identifier of a candidate object in at least one of the plurality of video streams with the unique biometric identifier of the object. Additionally, the instructions are further executable to detect, based on the monitoring, the object in a second video stream captured from a second camera of the plurality of cameras. Additionally, the instructions are further executable to output, on the user interface, the second video stream in response to detecting the object in the second video stream.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIG. 10 is a flowchart of additional aspects of the method of FIG. 5; and

FIG. 11 is a flowchart of additional aspects of the method of FIG. 5.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The systems and methods of the present disclosure enable a user (e.g., a security guard) to monitor multiple video streams simultaneously on a user interface. When an object (e.g., a person, vehicle, or any type of object) appears in a frame that is of interest to the user, referred to herein as an of-interest (OI) object, he/she may request to track the object across all of the video streams. The system and method involves generating a unique biometric identifier of the object and enrolling the object in a database. Subsequently, whenever the object appears in any of the video streams, the particular stream(s) that the object is present in at a given time are displayed to the user.

It should be noted that although the example of the object being a person is used primarily throughout the present disclosure, the object may be any living or non-living object that moves (e.g., an animal, a car, a ball, etc.). Accordingly, the systems and methods of the present disclosure may be applicable to scenarios such as tracking a ball/player in a sports stadium, tracking a car in a city, tracking a microscopic organism in a medical setting, etc.

Figure 1:
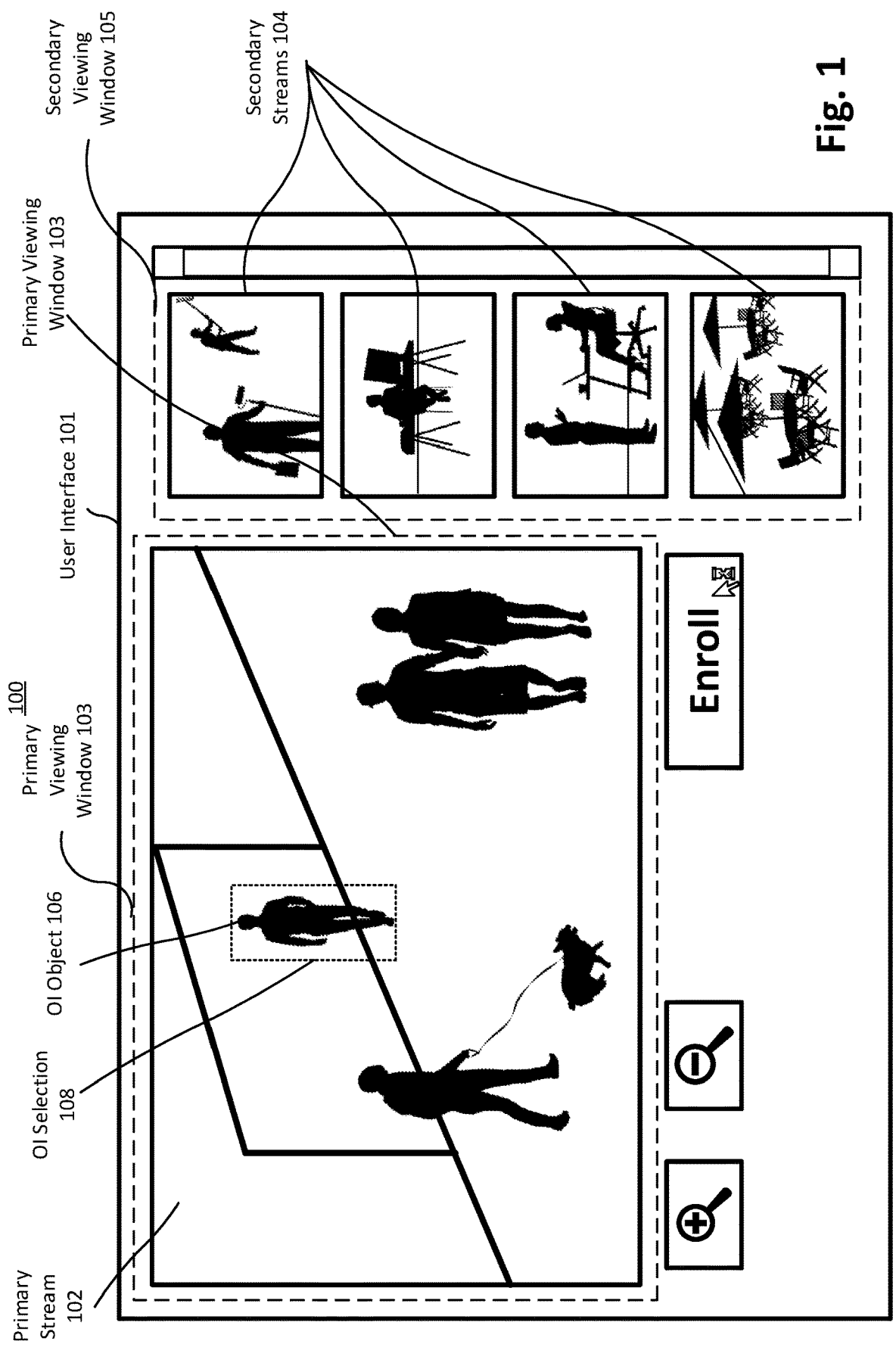
FIG. 1 is a diagram of a user interface at a first time when a selection of an of-interest (OI) object is made.

FIG. 1 is diagram 100 of user interface 101 at a first time when a selection of an of-interest (OI) object is made. User interface 101 includes five video streams in FIG. 1. Each of these video streams may originate from a respective camera installed in the environment being monitored. For example, the environment may be an office. Primary stream 102 may depict video surveillance of the front entrance of the office. Each of secondary streams 104 may depicts different areas in the office (e.g., an empty room being painted, a reception area, a conference room, a cafeteria, etc.). In an exemplary aspect, primary stream 102 is displayed more prominently compared to secondary streams 104. For example, primary stream 102 may have a larger display area, a central or primary area on the user interface 101, a higher frame rate, a higher resolution, etc., than secondary streams 104. In some aspects, a primary stream is a video stream in which an OI object is detected and/or is a video stream that a user has manually selected to be a primary stream. A secondary stream is a video stream that does not include the OI object and/or is not manually selected to be a primary stream.

Although only five streams are shown, one skilled in the art will appreciate that any number of streams may be presented on user interface 101. For example, there may be any number of primary video streams and any number of secondary video streams in user interface 101. A primary stream may be placed in primary viewing window 103 of user interface 101 and a secondary stream may be placed in secondary viewing window 105 of user interface 101. In the event that there are several video streams that cannot be displayed simultaneously because of the display area of user interface 101 being too small, a subset of video streams may be hidden inside primary viewing window 103 and/or secondary viewing window such that they are only visible when the user scrolls to or selects the portion where the video streams are hidden. In some aspects, only primary stream 102 may be displayed on user interface 101. The source of the primary stream 102 may change (e.g., from one camera to another) in response to the OI object appearing in the view of the new source, e.g., a camera previously associated with a secondary stream.

Suppose that a user is interested in tracking a person in primary stream 102. The user may provide a selection of the person by generating a boundary around the person. In FIG. 1, the user has selected OI object 106 by generating OI selection 108 around OI object 106. In some aspects, OI selection 108 may be a boundary of any shape or size. For example, if user interface 101 is displayed on a touchscreen-enabled computing device, the user may draw OI selection 108 as a circle around OI object 106. If user interface 101 is on a mouse-connected computing device (e.g., a desktop), the user may draw OI selection 108 using a cursor. In some aspects, after generating OI selection 108 around OI object 106, the user may click a button on user interface 101 (e.g., enroll) to confirm the selection.

Figure 2:
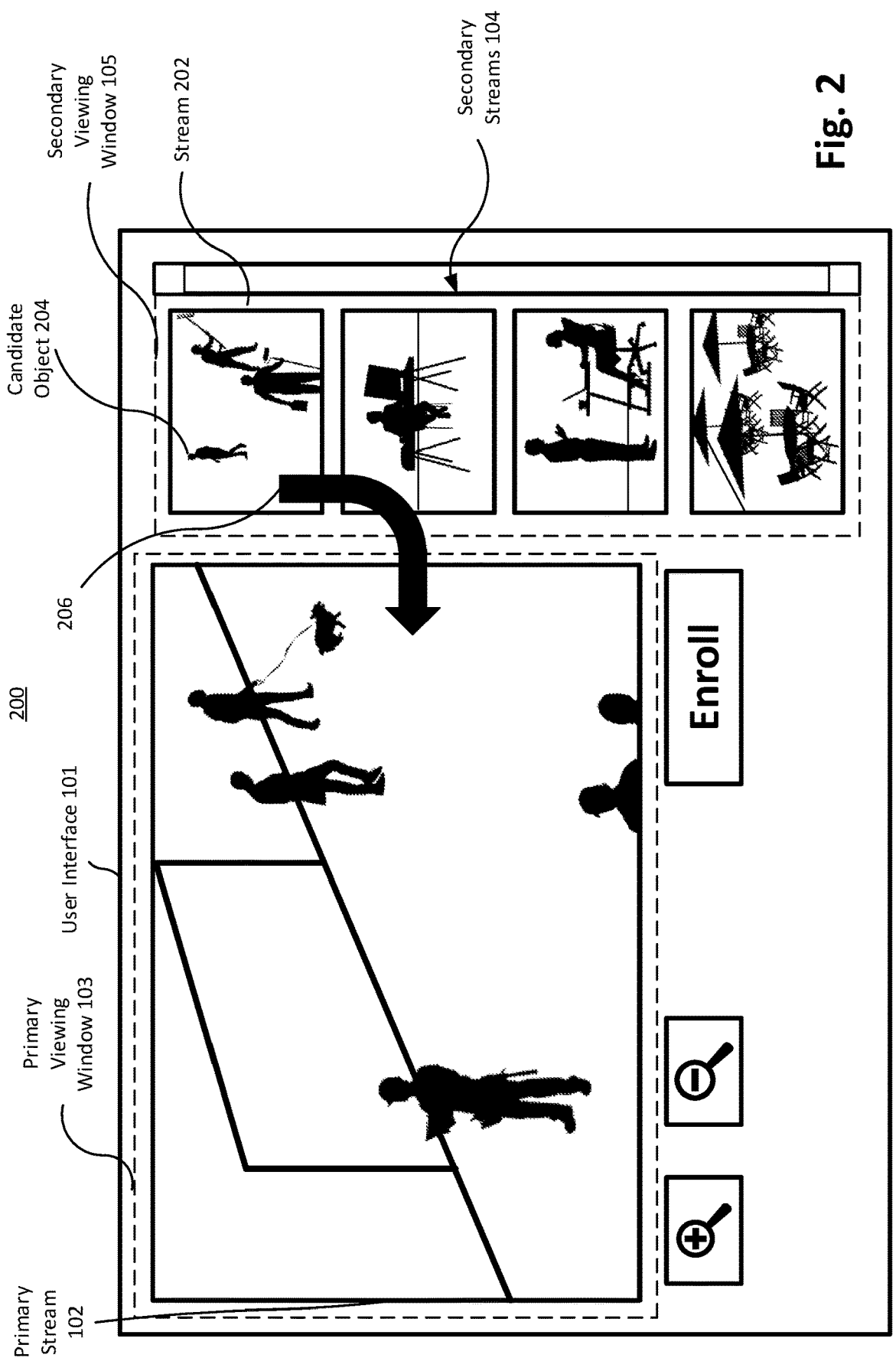
FIG. 2 is a diagram of a user interface at a second time when a selected OI object enters the view of a different camera.

FIG. 2 is diagram 200 of user interface 101 at a second time when a selected OI object enters the view of a different camera. The second time may be any time after the confirmation of the OI selection is received. In FIG. 2, OI object 106 has exited the entrance area of the environment and has entered a different room. This room is captured by a different camera that produces video stream 202. Video stream 202 is originally part of secondary streams 104. However, because OI object 106 is detected in stream 202, it may be of greater interest to the user than primary stream 102, and as indicated by arrow 206, stream 202 is moved to replace stream 102 in the primary viewing window 103.

Figure 3:
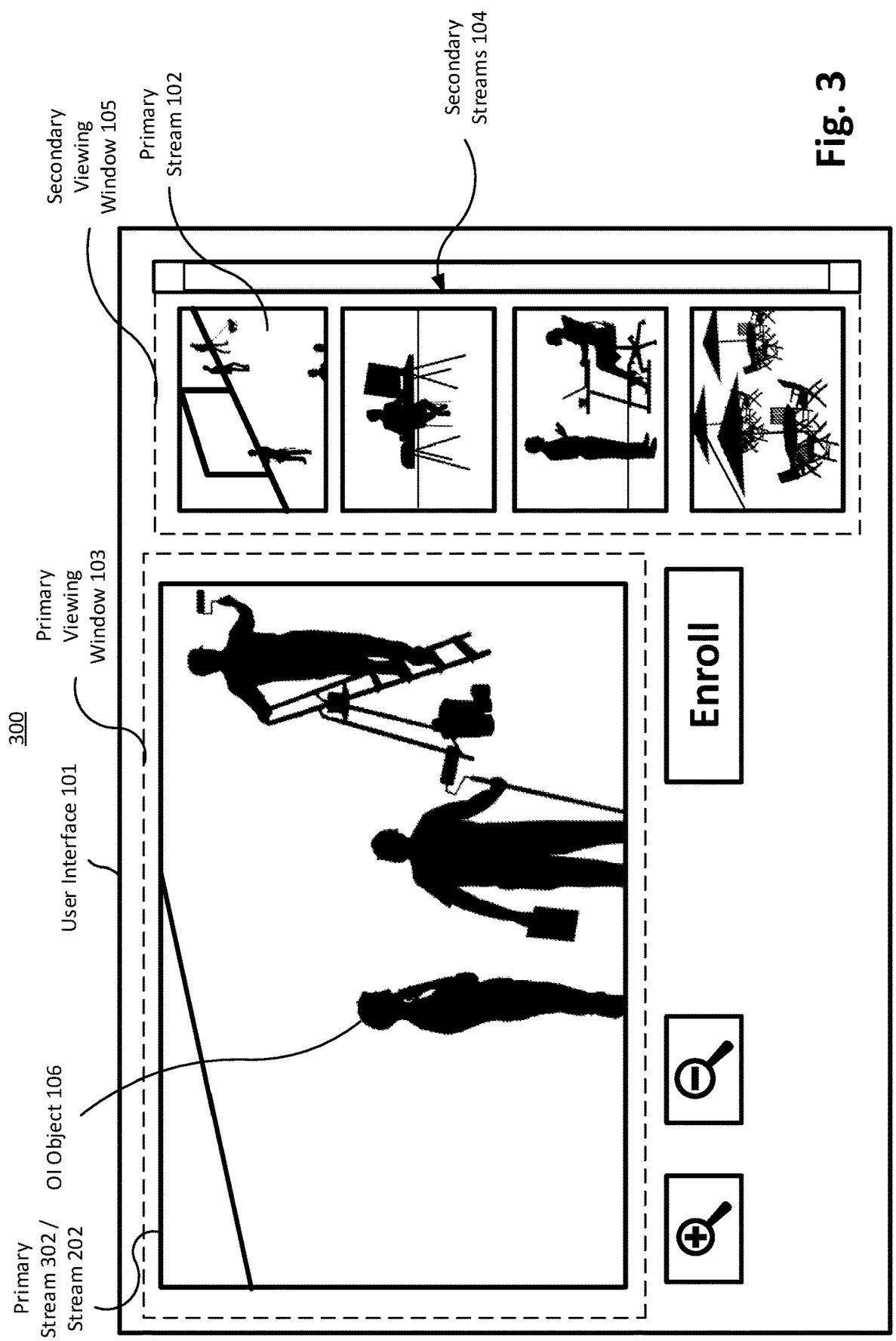
FIG. 3 is a diagram of a user interface at a third time when a current stream including the selected OI object is moved to a primary viewing window.

FIG. 3 is diagram 300 of user interface 101 at a third time when a current stream including the selected OI object is moved to a primary viewing window. As indicated by the arrow 206 in FIG. 2, stream 202 is made the primary stream in the primary viewing window 103 on user interface 101 because the OI object that the user wants to track has entered the view of the camera generating stream 202. Accordingly, in diagram 300, stream 202 becomes primary stream 302. In a version of user interface 101 having only a single primary viewing window 103, primary stream 102 may be no longer displayed and stream 202 at this third time, which may now be referred to as primary stream 302, takes its place in the primary viewing window 103. In a version of user interface 101 that also includes secondary streams 104 (e.g., as shown in FIG. 3), original primary stream 102 would be replaced by primary stream 302. Accordingly, in this version, primary stream 102 becomes a part of secondary streams 104 in secondary viewing window 105.

Figure 4:
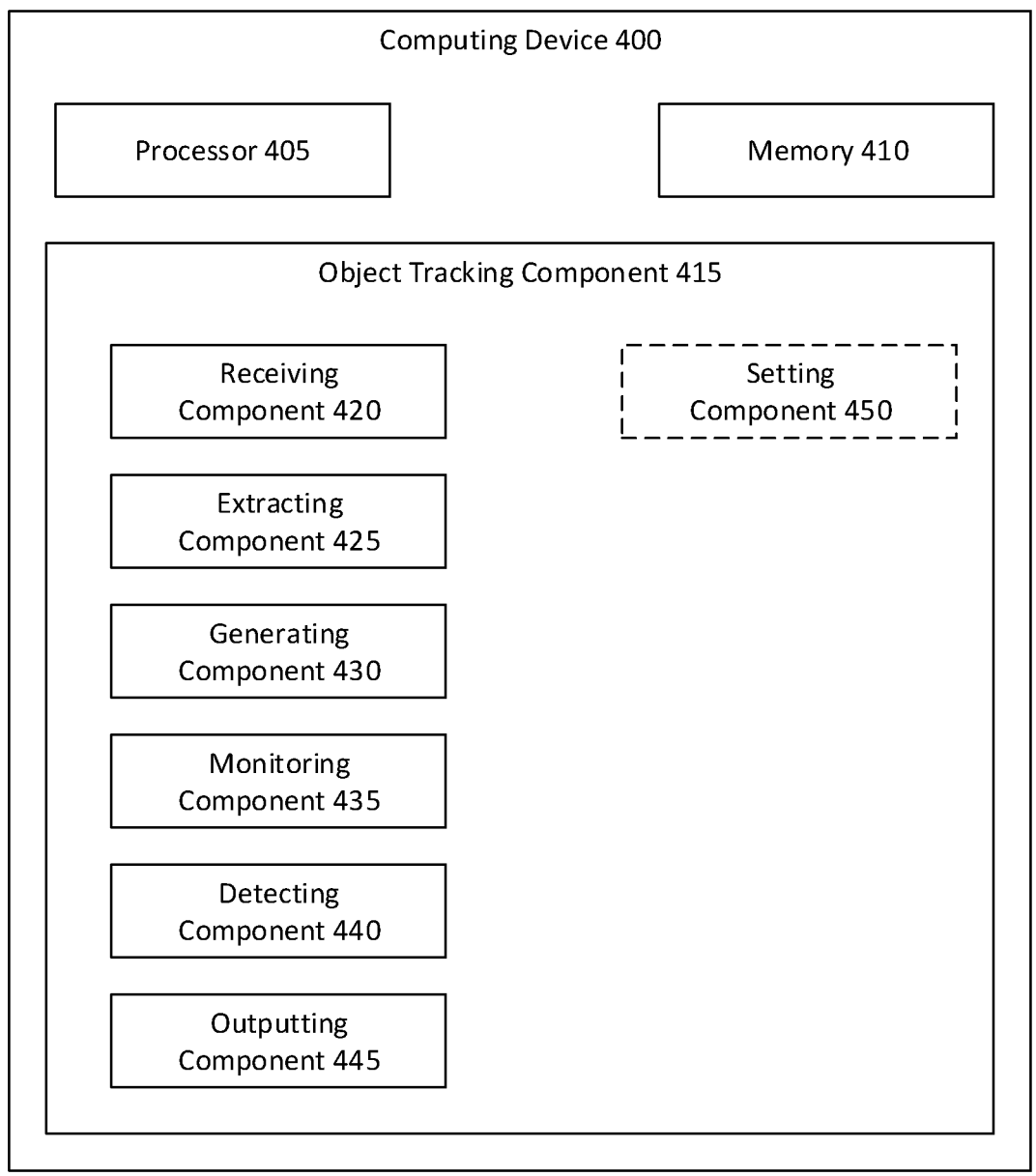
FIG. 4 is a block diagram of an example of a computer device having components configured to perform a method in a video surveillance system for tracking an OI object.
Figure 5:
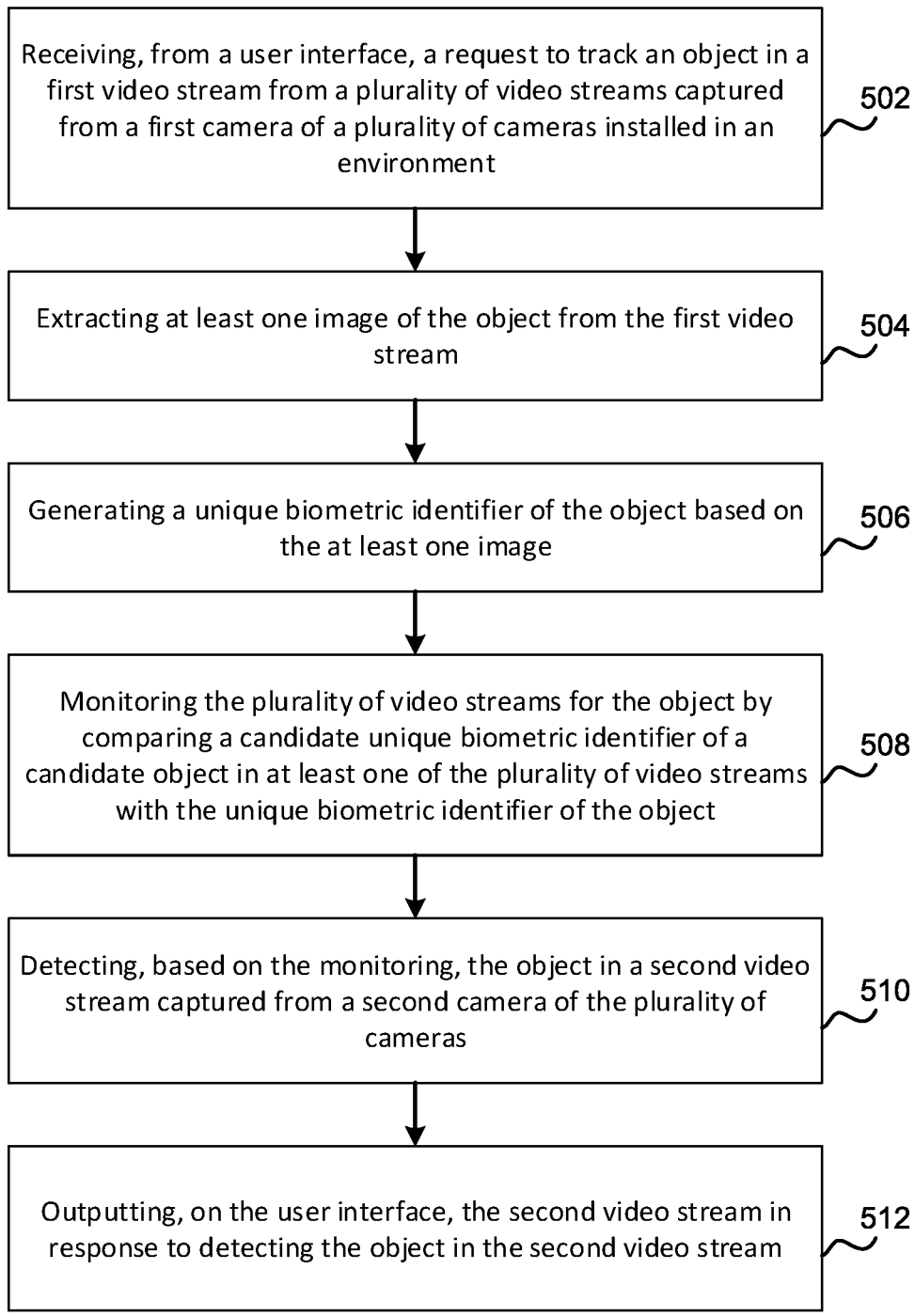
FIG. 5 is a flowchart of an example of a method of a method in a video surveillance system for tracking an OI object.

Referring to FIG. 4 and FIG. 5, in operation, computing device 400 may perform a method 500 of wireless communication, by such as via execution of object tracking component 415 by processor 405 and/or memory 410.

At block 502, the method 500 includes receiving, from a user interface, a request to track an object in a first video stream from a plurality of video streams captured from a first camera of a plurality of cameras installed in an environment. For example, in an aspect, computing device 400, processor 405, memory 410, object tracking component 415, and/or receiving component 420 may be configured to or may comprise means for receiving, from user interface 101, a request to track OI object 106 in primary stream 102 from a plurality of video streams captured from a first camera of a plurality of cameras installed in an environment.

For instance, the receiving at block 502 includes receiving a signal over a wired or wireless communication link, wherein the signal corresponds to a user input of a request to select and track an object received at a user interface of computing device 400 or another computing device in communication with computing device 400.

At block 504, the method 500 includes extracting at least one image of the object from the first video stream. For example, in an aspect, computing device 400, processor 405, memory 410, object tracking component 415, and/or extracting component 425 may be configured to or may comprise means for extracting at least one image of OI object 106 from primary stream 102. For example, one of the images extracted from a frame of primary stream 102 may be an image of the frame cropped to the boundaries of OI selection 108. Another image extracted from primary stream 102 may from a subsequent frame in which OI object 106 has moved slightly to a new position in the environment. The size of the another image may match the dimensions of OI selection 108 and include the entirety of OI object 106. Accordingly, one or multiple images may be extracted from primary stream 102, where each image includes OI object 106.

At block 506, the method 500 includes generating a unique biometric identifier of the object based on the at least one image. For example, in an aspect, computing device 400, processor 405, memory 410, object tracking component 415, and/or generating component 430 may be configured to or may comprise means for generating a unique biometric identifier of OI object 106 based on the at least one image. For instance, generating the unique biometric identifier may include applying an algorithm to the object in the image to obtain an identifier that is unique so that the identifier can be associated with the object.

In an alternative or additional aspect, the unique biometric identifier is an input feature vector of a machine learning algorithm configured to detect objects in an image that match the input feature vector. For example, if the object being tracked is a person, the machine learning algorithm may be configured to classify persons in images. If the object being tracked is an animal, the machine learning algorithm may be configured to classify animals (e.g., cats, dogs, etc.) in images.

In some aspects, the machine learning algorithm may receive and perform pre-processing on the image (e.g., make the image black and white, convert the image into numerical values using pixel values, resize the image, pad the image, etc.). The machine learning algorithm may then generate a feature vector that represents the image of the OI object. This feature vector may be determined by extracting different attributes in the image (e.g., eyes, nose, mouth, hands, shirt, etc.). The features may numerically describe the position, size, color, shape, etc., of the attributes. This feature vector is the unique biometric identifier of OI object 106. In some aspects, the unique biometric identifier may be a large (e.g., 512) floating point number that enables for multiple unique objects to be identified without matching another unique biometric identifier.

The machine learning algorithm is trained to classify different objects and, in order to do so, generates a feature vector for each input image. A plurality of weights and a decision making function (e.g., Bayes classification) may be applied to the feature vector to determine whether the image belongs in a particular class of objects. In some aspects, when the user requests to track the OI object, object tracking component 415 enrolls the selected OI object by re-training the machine learning algorithm to detect the selected OI object. For example, the machine learning algorithm may be a one-class support vector machine that is configured to determine whether an input object matches the OI object.

To improve the performance of the machine learning algorithm, multiple images of the OI object may be provided for the enrollment/training process. For example, one image may be a close-up shot of the OI object whereas another image may be a far-away shot of the OI object. One image may show the backside of the OI object, whereas another image may be a side profile of the OI object. The unique biometric identifier may be generated by the machine learning algorithm by processing all of the images. For example, the unique biometric identifier may be a feature vector that represents features of attributes extracted from all images.

In some aspects, the machine learning algorithm may be a neural network such as SqueezeNet.

At block 508, the method 500 includes monitoring the plurality of video streams for the object by comparing a candidate unique biometric identifier of a candidate object in at least one of the plurality of video streams with the unique biometric identifier of the object. For example, in an aspect, computing device 400, processor 405, memory 410, object tracking component 415, and/or monitoring component 435 may be configured to or may comprise means for monitoring the plurality of video streams for the object by comparing a candidate unique biometric identifier of candidate object 204 in at least one of the plurality of video streams with the unique biometric identifier of the object.

For example, object tracking component 415 may identify candidate objects in all of the plurality of streams. In order to determine if a group of pixels comprises a candidate object, object tracking component 415 may execute another machine learning algorithm that detects a particular object type in an image. For example, the another machine learning algorithm may determine whether an image includes a person (regardless of whether the person is OI object 106) and may highlight the location of the person by generating a boundary around the detected person. In stream 202, there are three persons visible according to FIG. 2. The another machine learning algorithm may identify these three persons as candidate objects.

Object tracking component 415 may then extract the images of the candidate objects, determine unique candidate biometric identifiers of each candidate object (e.g., determining feature vectors), and compare the unique candidate biometric identifiers with the unique biometric identifier of OI object 106. This may also simply involve executing the machine learning algorithm re-trained to identify OI object 106 on stream 202 directly (where the unique biometric identifiers are inherently calculated and compared). This may also involve executing the re-trained machine learning algorithm on the images of the candidate objects.

For example, referring to FIG. 2, object tracking component 415 may determine that the unique candidate biometric identifier of candidate object 204 matches the unique biometric identifier of OI object 106. This implies that candidate object 204 is OI object 106.

At block 510, the method 500 includes detecting, based on the monitoring, the object in a second video stream captured from a second camera of the plurality of cameras. For example, in an aspect, computing device 400, processor 405, memory 410, object tracking component 415, and/or detecting component 440 may be configured to or may comprise means for detecting, based on the monitoring, OI object 106 in stream 202 captured from a second camera of the plurality of cameras.

For example, at a given time, object tracking component 415 may determine that stream 202, which is captured from a different camera that captured primary stream 102, includes OI object 106.

At block 512, the method 500 includes outputting, on the user interface, the second video stream in response to detecting the object in the second video stream. For example, in an aspect, computing device 400, processor 405, memory 410, object tracking component 415, and/or outputting component 445 may be configured to or may comprise means for outputting, on user interface 101, primary stream 302 in response to detecting OI object 106 in stream 202. In this case, primary stream 302 and stream 202 are the same stream. The only difference is that primary stream 302 is stream 202 in primary viewing window 103. In the event that only primary viewing window 103 is shown on user interface 101 and secondary viewing window 105 is hidden, primary stream 102 may be replaced by primary stream 302. This replacement enables the user to view the stream that currently includes OI object 106. As OI object 106 moves into different parts of the environment, the stream that includes the OI object is automatically shown on user interface 101. A user is thus able to track any selected object very easily and quickly.

In an alternative or additional aspect, outputting the second video stream comprises replacing the first video stream with the second video stream in a viewing window of the user interface.

Figure 6:
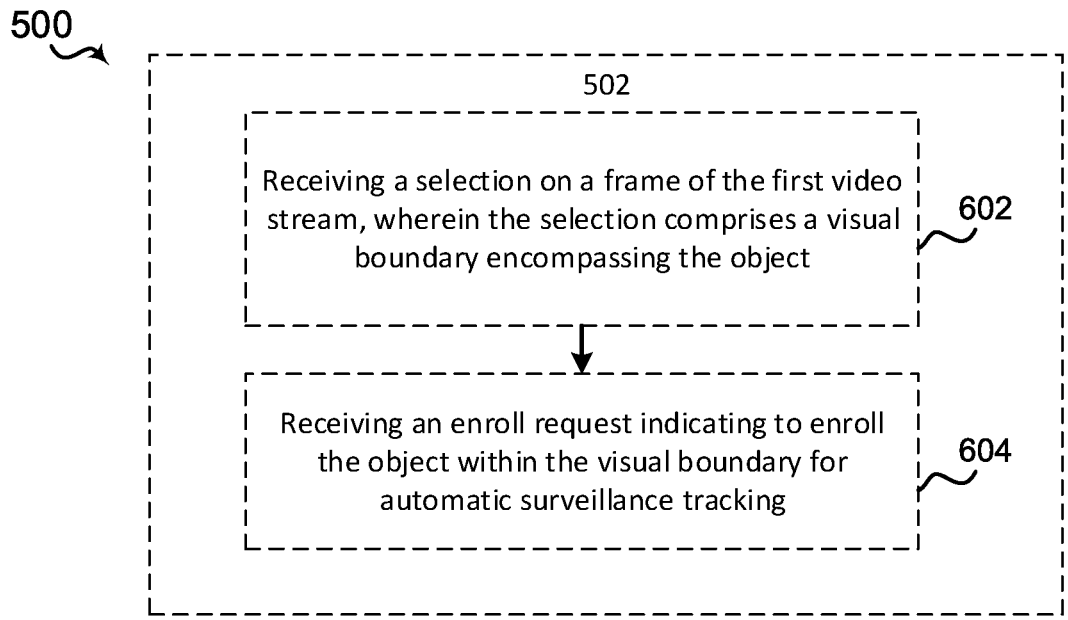
FIG. 6 is a flowchart of additional aspects of the method of FIG. 5.

Referring to FIG. 6, which describes the selection of a OI object for enrollment, in an alternative or additional aspect, at block 602, the receiving at block 502 of the request to track the object may further include receiving a selection on a frame of the first video stream, wherein the selection comprises a visual boundary encompassing the object. For example, in an aspect, computing device 400, processor 405, memory 410, object tracking component 415, and/or receiving component 420 may be configured to or may comprise means for receiving OI selection 108 on a frame of primary stream 102, wherein the selection comprises a visual boundary encompassing OI object 106. This selection may be made via a cursor, a gesture, a touch input, a voice command, etc.

In this optional aspect, at block 604, the receiving at block 502 of the request to track the object may further include receiving an enroll request indicating to enroll the object within the visual boundary for automatic surveillance tracking. For example, in an aspect, computing device 400, processor 405, memory 410, object tracking component 415, and/or receiving component 420 may be configured to or may comprise means for receiving an enroll request indicating to enroll OI object 106 within the visual boundary for automatic surveillance tracking. For example, the user may make OI selection 108 and select the enroll button on user interface 101 to confirm the selection.

In an alternative or additional aspect, user interface 101 is configured to simultaneously output a subset of the plurality of video streams, the subset comprising the first video stream and the second video stream (e.g., primary stream 102 and second streams 104 including stream 202), wherein a first display area of the first video stream is larger than a second display area of the second video stream. In this aspect, outputting the second video stream comprises increasing the second display area of the second video stream to be larger than the first display area of the first video stream. For example, as shown in FIG. 2 and FIG. 3, the display area of primary stream 102 is larger than the display area of stream 202. When OI object 106 is detected in stream 202, object tracking component 415 increases the display area of stream 202 and decreases the display area of primary stream 102. In some aspects, object tracking component 415 may also move stream 202 to primary viewing window 103 and primary stream 102 to secondary viewing window 105. This results in FIG. 3, where stream 202 (now referred to as primary stream 302) is larger than primary stream 102 (now part of secondary streams 104).

Figure 7:
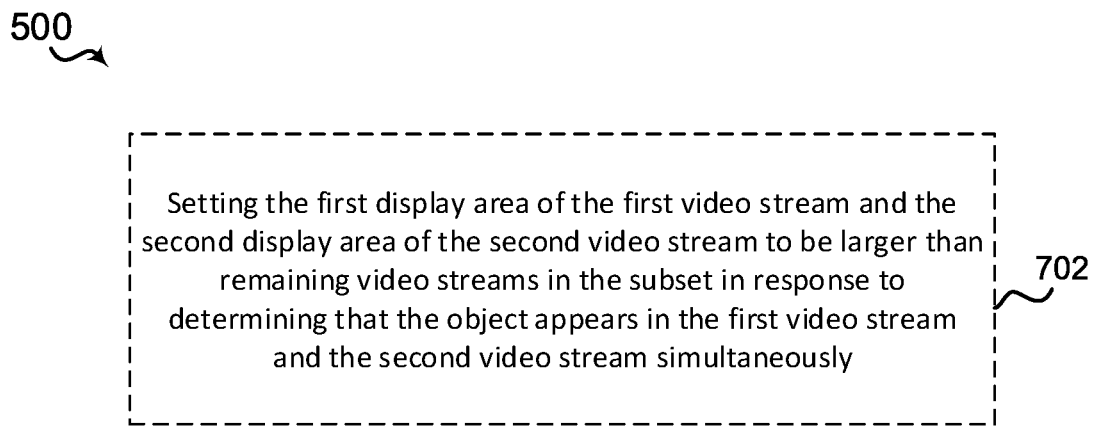
FIG. 7 is a flowchart of additional aspects of the method of FIG. 5.

Referring to FIG. 7, which describes setting display areas of streams including the OI object, in an alternative or additional aspect, at block 702, the method 500 may further include setting the first display area of the first video stream and the second display area of the second video stream to be larger than remaining video streams in the subset in response to determining that the object appears in the first video stream and the second video stream simultaneously. For example, in an aspect, computing device 400, processor 405, memory 410, object tracking component 415, and/or setting component 450 may be configured to or may comprise means for setting the first display area of primary stream 102 and the second display area of stream 202 to be larger than remaining video streams in the subset in response to determining that the object appears in both primary stream 102 and stream 202 simultaneously. In an alternative or additional aspect, the first display area of the first video stream and the second display area of the second video stream are equal. In this situation, stream 202 may be moved by object tracking component 415 to primary viewing window 103 and resized to match the display area of primary stream 102.

Figure 8:
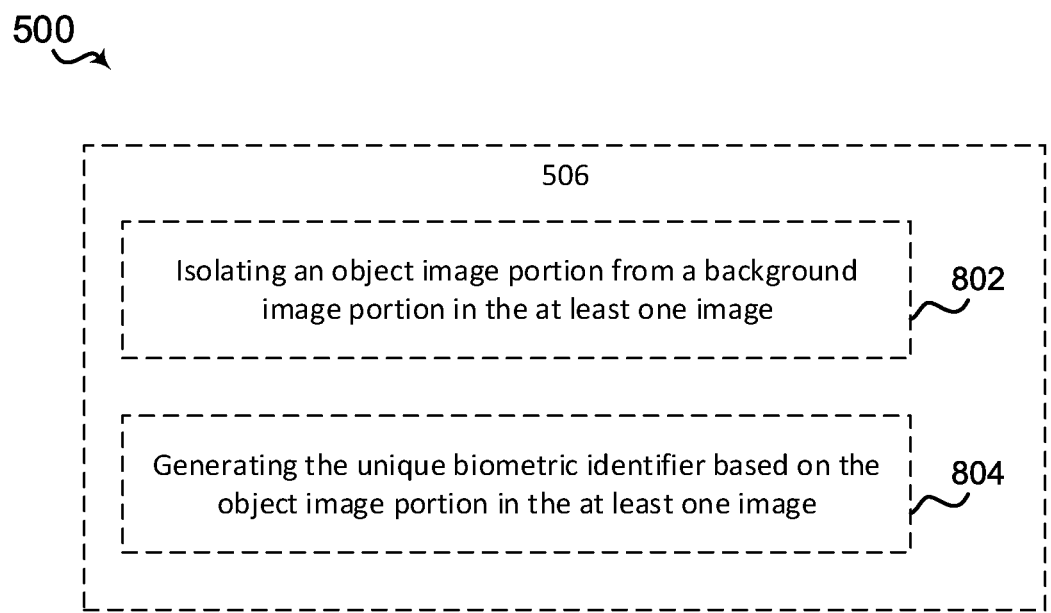
FIG. 8 is a flowchart of additional aspects of the method of FIG. 5.

Referring to FIG. 8, which describes isolating an object from the background in a OI selection, in an alternative or additional aspect, at block 802, the generating at block 506 of the unique biometric identifier further includes isolating an object image portion from a background image portion in the at least one image. In this optional aspect, at block 804, the generating at block 506 of the unique biometric identifier further includes generating the unique biometric identifier based on the object image portion in the at least one image.

For example, OI selection 108 may be a rectangular boundary, but only a portion of the pixels within the boundary are of OI object 106. The remaining pixels are a part of the background, which may change depending on where OI object 106 is standing in the environment. By extracting the object image portion, object identification and tracking is improved because there is no influence of the background image portion on, for example, the input to a machine learning algorithm.

Figure 9:
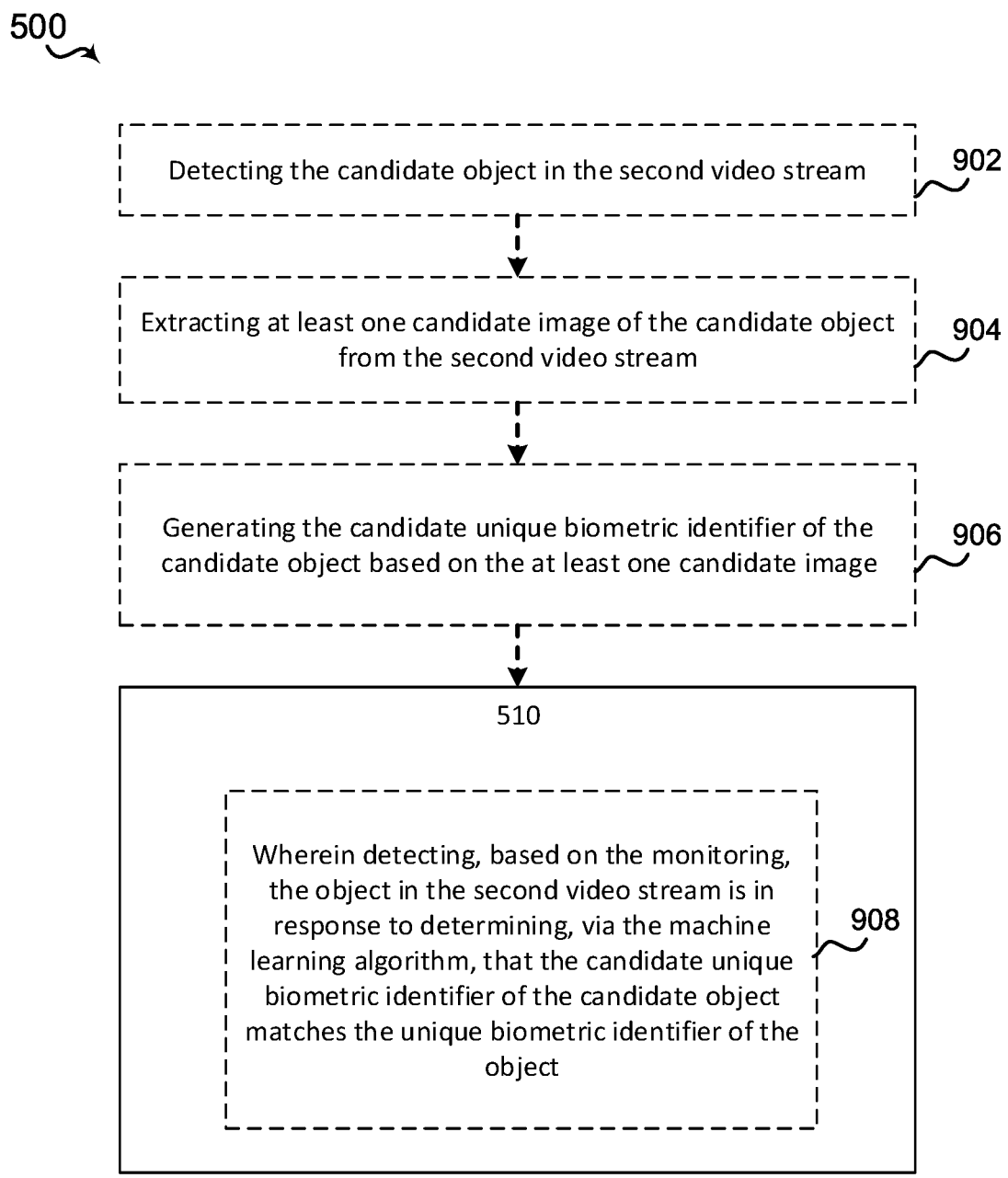
FIG. 9 is a flowchart of additional aspects of the method of FIG. 5.

Referring to FIG. 9, which describes identifying candidate objects, in an alternative or additional aspect, at block 902, the method 500 may further include detecting the candidate object in the second video stream. For example, in an aspect, computing device 400, processor 405, memory 410, object tracking component 415, and/or detecting component 440 may be configured to or may comprise means for detecting candidate object 204 (e.g., a person) in stream 202.

In this optional aspect, at block 904, the method 500 may further include extracting at least one candidate image of the candidate object from the second video stream. For example, in an aspect, computing device 400, processor 405, memory 410, object tracking component 415, and/or extracting component 425 may be configured to or may comprise means for extracting at least one candidate image of candidate object 204 from stream 202. For example, object tracking component 415 may generate a boundary (comparable to OI selection 108) around candidate object 204 (e.g., OI object 106 when it moves in front of the different camera), and extract the contents within the boundary as the at least one candidate image.

In this optional aspect, at block 906, the method 500 may further include generating the candidate unique biometric identifier of the candidate object based on the at least one candidate image. For example, in an aspect, computing device 400, processor 405, memory 410, object tracking component 415, and/or generating component 430 may be configured to or may comprise means for generating the candidate unique biometric identifier of candidate object 204 based on the at least one candidate image. For example, object tracking component 415 may apply a machine learning algorithm to convert the at least one candidate image into a unique biometric identifier (as described in FIG. 5).

In this optional aspect, at block 908, the detecting at block 510 of the object in the second video stream may further include detecting in response to determining, via the machine learning algorithm, that the candidate unique biometric identifier of the candidate object matches the unique biometric identifier of the object. For example, in an aspect, computing device 400, processor 405, memory 410, object tracking component 415, and/or detecting component 440 may be configured to or may comprise means for wherein detecting, based on the monitoring, OI object 106 in stream 202 is in response to determining, via the machine learning algorithm, that the candidate unique biometric identifier of candidate object 204 matches the unique biometric identifier of the object.

Referring to FIG. 10, which describes extracting multiple images of the OI object, in an alternative or additional aspect, at block 1002, the extracting at block 504 of the at least one image of the object from the first video stream further comprises extracting the at least one image from all frames in the first video stream in which the object appears during a period of time from receiving the request.

Because one image alone may not be a good representation of the object (the size of the object may be too small or the lighting in the environment may be too low), object tracking component 415 may extract multiple images of the object. One effective way of doing this is extracting images from all video frames that the object appears in primary stream 102. Another approach, to prevent too many object images from being extracted and causing overfitting in the machine learning algorithm and too much memory usage, is to only extract images for a set period of time (e.g., 10 seconds) after receiving the request.

In an alternative or additional aspect, the object is a person, and wherein the unique biometric identifier is based on non-facial features of the person. Non-facial features include clothing, body structure, pose, size, etc. Non-facial features are especially effective when the object is small in the frame (e.g., where a person is far away from the camera and meaningful facial features are not distinguishable).

Referring to FIG. 11, which describes using facial features to identify the OI object, in an alternative or additional aspect, at block 1102, the method 500 may further include extracting at least one additional image depicting a face of the person from the first video stream. For example, in an aspect, computing device 400, processor 405, memory 410, object tracking component 415, and/or extracting component 425 may be configured to or may comprise means for extracting at least one additional image depicting a face of the person from primary stream 102. This additional image may be a cropped version of OI selection 108 that does not include the body of OI object 106.

In this optional aspect, at block 1104, the method 500 may further include generating a unique facial biometric identifier of the face of the person based on the at least one additional image. For example, in an aspect, computing device 400, processor 405, memory 410, object tracking component 415, and/or generating component 430 may be configured to or may comprise means for generating a unique facial biometric identifier of the face of the person based on the at least one additional image. The unique facial biometric identifier may be generated in the same manner as the unique biometric identifier described in FIG. 5. The main difference is that the images used to create the unique biometric identifier include the entire body of the person, whereas the images used to create the unique facial biometric identifier include only the face of the person. An advantage of using the face instead of the entire body is that the object (e.g., a suspicious person) may appear in a different camera on a subsequent day and should still be tracked. However, if the person is wearing different clothes, object tracking component 415 may be unable to detect the person. In some aspects, an effective approach is to use both the unique biometric identifier and the unique facial biometric identifier to identify the object. Thus, if the facial attributes match, even if the remaining body attributes do not, an object will still be detected.

In this optional aspect, at block 1106, the monitoring at block 508 of the plurality of video streams for the object further comprises comparing a candidate unique facial biometric identifier of candidate object 204 with the unique facial biometric identifier.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus in a video surveillance system for tracking an of-interest (OI) object, comprising:
a memory; and
a processor coupled with the memory and configured to:
receive, from a user interface, a request to track an object in a first video stream from a plurality of video streams, wherein the first video stream is captured from a first camera of a plurality of cameras installed in an environment;
extract at least one image of the object from the first video stream;
generate a unique biometric identifier of the object based on the at least one image;
monitor the plurality of video streams for the object by comparing a candidate unique biometric identifier of a candidate object in at least one of the plurality of video streams with the unique biometric identifier of the object;
detect, based on the monitoring, the object in a second video stream captured from a second camera of the plurality of cameras, wherein the user interface is configured to simultaneously output a subset of the plurality of video streams, the subset comprising the first video stream and the second video stream, wherein a first display area of the first video stream is larger than a second display area of the second video stream; and
increase the second display area of the second video stream to be larger than the first display area of the first video stream in response to detecting the object in the second video stream.

2. The apparatus of claim 1, wherein to receive, from the user interface, the request to track the object in the first video stream from the plurality of video streams the processor is further configured to:
receive a selection on a frame of the first video stream, wherein the selection comprises a visual boundary encompassing the object; and
receive an enroll request indicating to enroll the object within the visual boundary for automatic surveillance tracking.

3. The apparatus of claim 1, wherein to output the second video stream comprises replacing the first video stream with the second video stream in a viewing window of the user interface.

4. The apparatus of claim 1, wherein to generate the unique biometric identifier the processor is further configured to:
isolate an object image portion from a background image portion in the at least one image; and
generate the unique biometric identifier based on the object image portion in the at least one image.

5. The apparatus of claim 1, wherein the unique biometric identifier is an input feature vector of a machine learning algorithm configured to detect objects in an image that match the input feature vector.

6. The apparatus of claim 5, wherein to detect the object in the second video stream comprises to:
detect the candidate object in the second video stream;
extract at least one candidate image of the candidate object from the second video stream;
generate the candidate unique biometric identifier of the candidate object based on the at least one candidate image; and
wherein to detect, based on the monitoring, the object in the second video stream is in response to determining, via the machine learning algorithm, that the candidate unique biometric identifier of the candidate object matches the unique biometric identifier of the object.

7. The apparatus of claim 1, wherein the unique biometric identifier is a floating point number.

8. The apparatus of claim 1, wherein to extract the at least one image of the object from the first video stream the processor is further configured to extract the at least one image from all frames in the first video stream in which the object appears during a period of time from receiving the request.

9. The apparatus of claim 1, wherein the object is a person, and wherein the unique biometric identifier is based on non-facial features of the person.

10. The apparatus of claim 9, wherein the processor is further configured to:
extract at least one additional image depicting a face of the person from the first video stream;
generate a unique facial biometric identifier of the face of the person based on the at least one additional image; and
wherein to monitor the plurality of video streams for the object the processor is further configured to compare a candidate unique facial biometric identifier of the candidate object with the unique facial biometric identifier.

11. The apparatus of claim 1, wherein to extract the at least one image the processor is further configured to:
receive a selection on a frame of the first video stream, wherein the selection comprises a visual boundary encompassing the object; and
identify the selection as the at least one image for extraction.

12. The apparatus of claim 1, wherein to output the second video stream comprises to:
set the first display area of the first video stream and the second display area of the second video stream to be larger than remaining video streams in the subset in response to determine that the object appears in the first video stream and the second video stream simultaneously.

13. The apparatus of claim 12, wherein the first display area of the first video stream and the second display area of the second video stream are equal.

14. A method in a video surveillance system for tracking an of-interest (OI) object, comprising:
receiving, from a user interface, a request to track an object in a first video stream from a plurality of video streams, wherein the first video stream is captured from a first camera of a plurality of cameras installed in an environment;
extracting at least one image of the object from the first video stream;
generating a unique biometric identifier of the object based on the at least one image;
monitoring the plurality of video streams for the object by comparing a candidate unique biometric identifier of a candidate object in at least one of the plurality of video streams with the unique biometric identifier of the object;
detecting, based on the monitoring, the object in a second video stream captured from a second camera of the plurality of cameras, wherein the user interface is configured to simultaneously output a subset of the plurality of video streams, the subset comprising the first video stream and the second video stream, wherein a first display area of the first video stream is larger than a second display area of the second video stream; and increasing the second display area of the second video stream to be larger than the first display area of the first video stream in response to detecting the object in the second video stream.

15. The method of claim 14, wherein receiving, from the user interface, the request to track the object in the first video stream from the plurality of video streams further comprises:

receiving a selection on a frame of the first video stream, wherein the selection comprises a visual boundary encompassing the object; and receiving an enroll request indicating to enroll the object within the visual boundary for automatic surveillance tracking.

16. The method of claim 14, wherein outputting the second video stream comprises replacing the first video stream with the second video stream in a viewing window of the user interface.

17. The method of claim 14, wherein generating the unique biometric identifier further comprises:

isolating an object image portion from a background image portion in the at least one image; and generating the unique biometric identifier based on the object image portion in the at least one image.

18. The method of claim 14, wherein the unique biometric identifier is an input feature vector of a machine learning algorithm configured to detect objects in an image that match the input feature vector.

19. The method of claim 18, wherein detecting the object in the second video stream comprises:

detecting the candidate object in the second video stream;

extracting at least one candidate image of the candidate object from the second video stream;

generating the candidate unique biometric identifier of the candidate object based on the at least one candidate image; and wherein detecting, based on the monitoring, the object in the second video stream is in response to determining, via the machine learning algorithm, that the candidate unique biometric identifier of the candidate object matches the unique biometric identifier of the object.

20. The method of claim 14, wherein the unique biometric identifier is a floating point number.

21. The method of claim 14, wherein extracting the at least one image of the object from the first video stream further comprises extracting the at least one image from all frames in the first video stream in which the object appears during a period of time from receiving the request.

22. The method of claim 14, wherein the object is a person, and wherein the unique biometric identifier is based on non-facial features of the person.

23. The method of claim 22, further comprising:

extracting at least one additional image depicting a face of the person from the first video stream;

generating a unique facial biometric identifier of the face of the person based on the at least one additional image; and wherein monitoring the plurality of video streams for the object further comprises comparing a candidate unique facial biometric identifier of the candidate object with the unique facial biometric identifier.

24. The method of claim 14, wherein extracting the at least one image further comprises:

receiving a selection on a frame of the first video stream, wherein the selection comprises a visual boundary encompassing the object; and identifying the selection as the at least one image for extraction.

25. The method of claim 14, wherein outputting the second video stream comprises:

setting the first display area of the first video stream and the second display area of the second video stream to be larger than remaining video streams in the subset in response to determining that the object appears in the first video stream and the second video stream simultaneously.

26. The method of claim 25, wherein the first display area of the first video stream and the second display area of the second video stream are equal.

* * * * *